United States Patent

Schulte et al.

[11] Patent Number: 5,770,141
[45] Date of Patent: Jun. 23, 1998

[54] PROCESS FOR THE PRODUCTION OF A FILLED REACTION MIXTURE

[75] Inventors: Klaus Schulte, Bergisch Gladbach; Heinrich Ersfeld; Karl Dieter Kreuer, both of Leverkusen; Christian Wolfrum, Köln, all of Germany

[73] Assignee: Bayer Aktiengesellschaft, Leverkusen, Germany

[21] Appl. No.: 447,304

[22] Filed: May 22, 1995

[30] Foreign Application Priority Data

May 27, 1994 [DE] Germany .......................... 44 18 505.7

[51] Int. Cl.[6] .................................................. B28B 1/20
[52] U.S. Cl. ..................... 264/311; 264/310; 264/328.6; 264/328.11; 523/333
[58] Field of Search ........................ 523/333; 264/328.6, 264/328.11, 310, 311

[56] References Cited

U.S. PATENT DOCUMENTS

| | | |
|---|---|---|
| 3,752,449 | 8/1973 | Schwab et al. ............................ 366/88 |
| 3,843,100 | 10/1974 | Haas et al. .............................. 366/76.6 |
| 3,920,223 | 11/1975 | Krueger ................................ 366/156.2 |
| 4,059,661 | 11/1977 | Eck et al. .................................. 264/54 |
| 4,275,033 | 6/1981 | Schulte et al. .......................... 422/133 |
| 4,990,300 | 2/1991 | Rebers .................................. 264/328.6 |
| 5,332,309 | 7/1994 | Ramazzotti et al. ...................... 366/88 |

FOREIGN PATENT DOCUMENTS

| | | |
|---|---|---|
| 411598 | 2/1991 | European Pat. Off. . |
| 2674181 | 9/1992 | France . |
| 2817687 | 10/1979 | Germany . |
| 838030 | 6/1960 | United Kingdom . |

*Primary Examiner*—Paul R. Michl
*Assistant Examiner*—John J. Guarriello
*Attorney, Agent, or Firm*—Joseph C. Gil; Noland J. Cheung

[57] ABSTRACT

A process is described for the production of a curable multi-component reaction mixture (and, in particular, a polyurethane), containing filler in which the reaction components are premixed and then mixed with the dry filler in a friction mixer having a conically shaped screw rotatable in a conical mixing chamber. The friction mixer is preferably operated under a fractional load at a low rotational speed.

1 Claim, 2 Drawing Sheets

PROCESS FOR THE PRODUCTION OF A FILLED REACTION MIXTURE

BACKGROUND OF THE INVENTION

The present invention relates to a process for the production of a filled reaction mixture (i.e., a reaction mixture which contains filler), wherein the reactive components of the reaction mixture are first mixed together and the filler is subsequently mixed into the reaction mixture in dry form, i.e. in predispersed form.

The incorporation of dry fillers into curable polymers is difficult due to the high gas content of dry fillers, dusting, the tendency to form agglomerates and difficulties with wetting. Frequently, the fillers are premixed with a small quantity of a liquid compatible with the polymer or with a small quantity of the polymer in order to eliminate problems of wetting and dusting and high levels of gas entrainment during the actual production of the curable compound. In the case of reactive mixtures, one option is first to mix the filler with one of the reactive components of the reactive mixture. However, this approach has a negative influence upon the composite of filler and cured reaction mixture since mixing of the reaction component applied onto the surface of the filler with the other reaction component may proceed only by diffusion such that it may be impossible to produce a curable mixture in the vicinity of the filler surface within the constraints of the reaction time.

According to prior proposals (Kunststoffhandbuch, Volume VII, 1966, page 157; and U.S. Pat. No. 4,275,033), the reactive components can be simultaneously mixed with the filler in stirred mixing chambers. However, such a process is suitable only for reactive compounds which cure relatively slowly or at elevated temperature after mixing since relatively long mixing times are required.

It has also been proposed in European Patent 411,598 to first mix the reactive components in a stirred mixing chamber and to then introduce the filler into the mixing chamber beneath the stirrer. This process is suitable only for very readily wettable fillers such as cork. The reactive mixture must moreover have relatively long reaction times at the temperature prevailing in the mixing chamber.

The problem common to the use of stirrers to mix fillers and reactive components is that a certain degree of curing always occurs within the stirrer so that elaborate cleaning procedures using solvents are necessary.

High-efficiency, self-cleaning mixing units for the reactive components such as high pressure injection mixers and friction mixers running at elevated rotational speeds are not suitable for mixing with fillers since the viscosity of reactive mixtures containing filler is too high and since the abrasiveness of the fillers can destroy the mixing unit. Self-cleaning friction mixers are known and described in German Auslegeschriften 2,062,008, 2,229,649 and 3,730,782 and European Patent 340,436. These references do not suggest the use of such mixers in preparing reactive mixers containing fillers.

DESCRIPTION OF THE INVENTION

Figure 1:
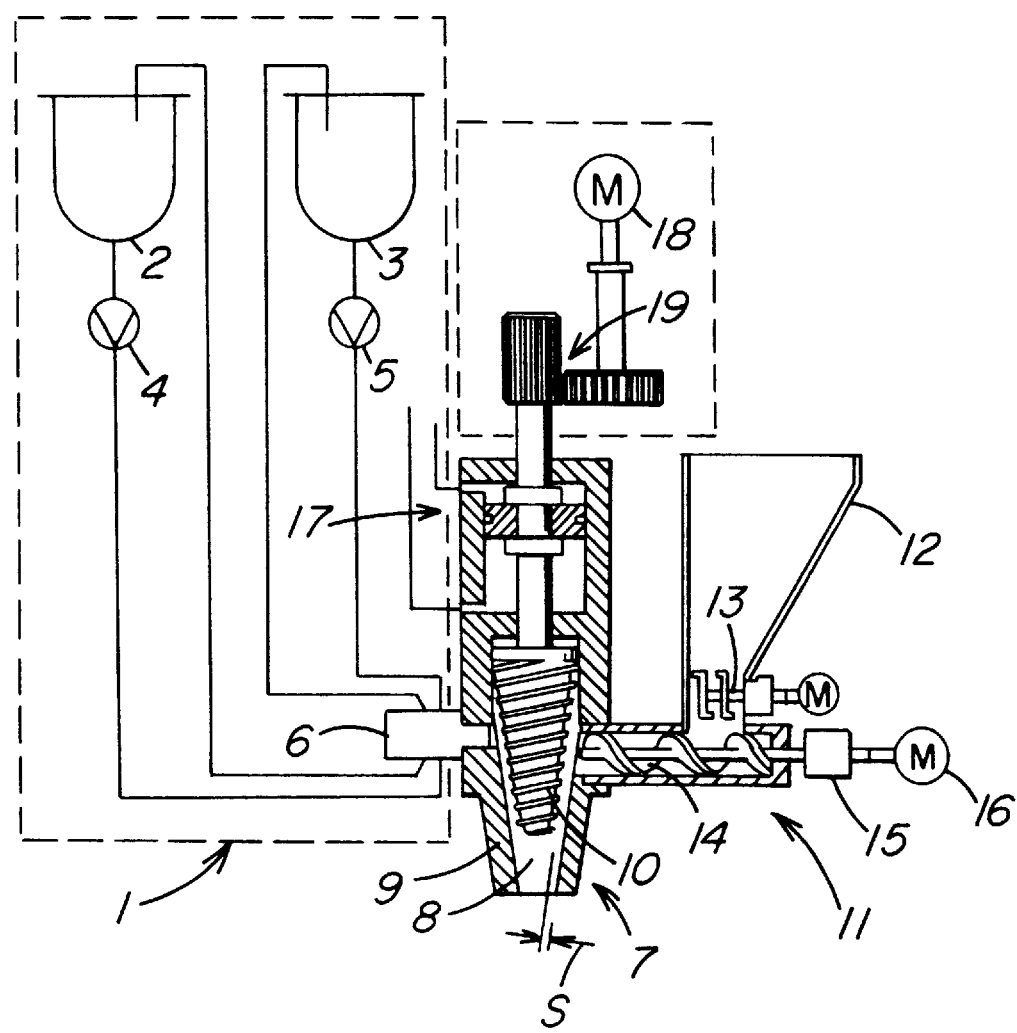
FIG. 1 shows one device useful in the process of the present invention.

It has now been found that self-cleaning friction mixers are excellently suited to mixing premixed reactive components with filler if they are operated under a fractional load (i.e., below its discharge capacity) at a low rotational speed.

The present invention thus provides a process for the production of a curable multi-component reaction mixture containing filler comprising premixing the reaction components and subsequently incorporating the fillers therein, wherein the premixed reaction components are mixed with dry fillers in a friction mixer, wherein the friction mixture is operated at rotational speeds of preferably 500 to 5,000 revolutions per minute.

The process according to the invention is particularly suitable for the production of polyurethanes containing filler, wherein isocyanates and compounds having isocyanate-reactive hydrogen atoms are used as the reactive components.

Customary fillers which are suitable according to the invention include, for example, cement, lime, chalk, barium sulphate, glass fibers, and in particular ground glass fibers or silicate minerals. It is also possible to use recycled plastic products, in particular polyurethane such as foam powder produced from comminuted foam waste or comminuted thermoplastic waste or also comminuted waste from, for example, cable scrap.

The process according to the invention is in particular suitable for reactive mixture:filler volume ratios of up to 100:300. The process is particularly preferably used when volume ratios of reactive mixture:filler in the range above 100:50, and in particular between 100:100 and 100:300, are to be used.

The friction mixers which may be used according to the invention have a conically shaped screw in a conical mixing chamber, wherein the reaction mixture is introduced into the space between the screw and mixing chamber at right angles to the axis of the screw from one side and the filler is introduced from the other side. The outlet of the mixing chamber is located in the discharge direction beneath the smaller diameter end of the conical screw. According to the invention, the gap between the conical screw and the wall of the mixing chamber should be larger than the filler particles.

For the purpose of cleaning the mixing chamber, the screw is arranged in the mixing chamber so that it may be displaced in an axial direction, such that, for example, after the end of a shot, i.e. once a mold has been filled with the reaction mixture containing filler, the screw and the mixing chamber wall may be brought into contact. In order to ensure wall contact, the cone of the screw and the cone of the mixing chamber have the same cone angle. Friction mixers which are suitable herein are known and described in German Auslegeschriftten 2,062,008, 2,229,649, and 3,730, 782 and in European Patent 340,436, all the disclosures of which are herein incorporated by reference.

Mixing in friction mixers occurs in that material is promoted faster if between the windings of the screw than if in contact with the wall of the conical chamber.

Such friction mixers are characterized by a small ratio (as compared to screw conveyors) of volume between screw windings and gap volume which ratio is about 1:1 to about 5:1, preferably about 2:1 to about 4:1. Screw volume is the free volume between the windings of the screw. Gap volume is the product of surface of the mixing chamber multiplied by the width of the gap.

It is preferred according to the invention for the screw to be of a conical shape along its entire length, in contrast to prior proposals according to which a cylindrical section is provided in the larger diameter section of the screw.

According to the invention, in order to mix the reaction mixture with fillers, the friction mixer is operated at rotational speeds which are considerably lower than the rotational speeds used when using friction mixers to mix reactive components (12,000 to 20,000 rpm). According to the invention, the rotational speed of the cone is 500 to 5,000 rpm, preferably below 3,000 rpm.

According to the invention, the friction mixer is operated at below its discharge capacity. The maximum discharge capacity of the friction mixer at a given rotational speed of the screw is determined by the space between the screw and the mixing chamber wall being filled up to the feed openings for the components. If the maximum discharge capacity is exceeded, the mixture components back up in the upstream section of the screw. If the friction mixer is fed at a rate below the discharge capacity, the space between the screw and the mixing chamber wall is completely filled (under a fractional load) only from a point (in the direction of flow) below the inlet opening for the reaction mixture and filler. The friction mixer is preferably operated at 5 to 30% of the maximum discharge capacity.

The cone angle of the screw if preferably between 5° and 15° (angle between the axis of the cone and the surface line of the cone). The screw may preferably be provided with an increasing pitch in the discharge direction, such that the discharge rate is increased in accordance with the narrowing free cross-section.

The reaction components are preferably mixed in a high-efficiency high-pressure injection mixer in which the reactive components are injected at elevated pressure into a mixing chamber from opposite sides (see Kunststoffhandbuch, Volume VII, 1993, pages 177 et seq.).

The filler may be conveyed from a storage tank directly into the friction mixer using a metering screw.

It has been found that when the friction mixer is operated at low rotational speeds according to the invention, there is no wear of the screw and mixing chamber wall despite the elevated abrasiveness of the fillers. Naturally, self-cleaning does not occur at the low rotational speeds according to the invention. Thus, in order to clean the friction mixer, the screw is brought into contact with the mixing chamber wall by axial displacement of the screw and the rotational speed is increased to the self-cleaning range of speeds, i.e. to 12,000 rpm and higher, wherein feeding of the reaction mixture and fillers is naturally suspended during the cleaning operation.

The invention is described below in greater detail with reference to the drawings.

Premixing I of the reaction mixture proceeds by feediong the liquid reaction components from storage tanks 2, 3 via metering pumps 4, 5 into the high pressure injection mixhead 6. The premixed reaction mixture is discharged from the mixhead 6 directly into the friction mixer 7. The friction mixer 7 consists of the conical housing 9 and the conical screw 10 arranged along the axis 8 of the conical housing 9. The screw 10 is rotated around the axis 8 by means of the drive motor 18 and transmission gears 19. The filler metering unit 11 consists of a storage hopper 12 with rotary disaggregator 13 and the filler metering screw 14 driven by the drive motor 16 and gears 15, which screw discharges directly into the friction mixture. The screw 10 may be displaced along the axis 8 by the hydraulic ram 17. The gap s between the screw 10 and the mixing chamber wall 9 is selected by axial displacement of the screw 10 such that it is larger than the filler particles.

Figure 2:
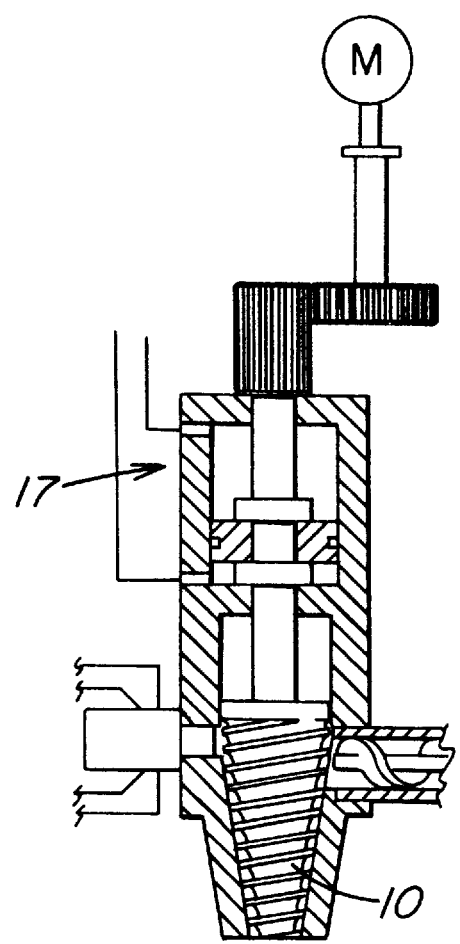
FIG. 2 shows a friction mixer in the cleaning position.

On completion of a shot, the screw 10 is lowered along the axis 8 such that it comes into contact with the wall and the rotational speed of the screw 10 is then increasing to the cleaning speed. FIG. 2 shows the friction mixer in the cleaning position.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a curable multi-component reaction mixture containing fillers comprising:

a) premixing the reaction components in a high pressure injection mixer, b) introducing the pre-mixed reaction components and dry filler into a friction mixer, said friction mixer having a conically shaped screw having a multiplicity of screw windings, said screw being rotatable in a conical mixing chamber with a gap formed between the wall of said chamber and the screw and operating under a fractional load, with said screw rotating at a speed of from 500 to 5,000 rpm, and wherein the ratio of the volume between the screw windings to the volume of said gap is from about 1:1 to about 5:1, c) introducing the mixture of step b) into a mold, d) stopping the supply of reaction components and filler once said mold is filled, and e) increasing the speed of said screw to 12,000 rpm or higher and bringing said screw into contact with the wall of said mixing chamber in order to clean said chamber.

* * * * *